(12) United States Patent
Zeng

(10) Patent No.: US 7,668,396 B2
(45) Date of Patent: Feb. 23, 2010

(54) METHOD AND SYSTEM FOR NOISE REDUCTION IN AN IMAGE

(75) Inventor: Steve Zhihua Zeng, Newmarket (CA)

(73) Assignee: Vixs Systems, Inc., Toronto, Ontario (CA)

( * ) Notice: Subject to any disclaimer, the term of this patent is extended or adjusted under 35 U.S.C. 154(b) by 713 days.

(21) Appl. No.: 10/673,612

(22) Filed: Sep. 29, 2003

(65) Prior Publication Data

US 2005/0069221 A1  Mar. 31, 2005

(51) Int. Cl.
 *G06K 9/40* (2006.01)
 *H04N 9/74* (2006.01)
(52) U.S. Cl. .................. 382/275; 382/264; 348/597
(58) Field of Classification Search .................. None
 See application file for complete search history.

(56) References Cited

U.S. PATENT DOCUMENTS

| | | | |
|---|---|---|---|
| 4,866,395 A | 9/1989 | Hosteller | |
| 5,027,203 A | 6/1991 | Samad et al. | |
| 5,093,847 A | 3/1992 | Cheng | |
| 5,115,812 A | 5/1992 | Sano et al. | |
| 5,231,677 A * | 7/1993 | Mita et al. | 382/266 |
| 5,253,056 A | 10/1993 | Puri | |
| 5,392,137 A * | 2/1995 | Okubo | 358/462 |
| 5,475,434 A | 12/1995 | Kim | |
| 5,563,950 A | 10/1996 | Easter et al. | |
| 5,602,589 A | 2/1997 | Vishwanath et al. | |
| 5,606,630 A * | 2/1997 | Maeda et al. | 382/254 |
| 5,635,985 A | 6/1997 | Boyce et al. | |
| 5,644,361 A | 7/1997 | Ran et al. | |
| 5,652,749 A | 7/1997 | Davenport et al. | |
| 5,729,360 A * | 3/1998 | Kita et al. | 358/500 |
| 5,732,391 A | 3/1998 | Fiocca | |
| 5,737,020 A | 4/1998 | Hall et al. | |
| 5,740,028 A | 4/1998 | Sugiyama et al. | |
| 5,747,796 A | 5/1998 | Heard et al. | |
| 5,790,686 A * | 8/1998 | Koc et al. | 382/107 |
| 5,844,545 A | 12/1998 | Suzuki et al. | |
| 5,844,627 A | 12/1998 | May et al. | |
| 5,850,443 A | 12/1998 | Van Oorschot et al. | |
| 5,940,130 A | 8/1999 | Nilsson et al. | |
| 5,996,029 A | 11/1999 | Sugiyama et al. | |
| 6,005,623 A | 12/1999 | Takahashi et al. | |
| 6,005,624 A | 12/1999 | Vainsencher | |

(Continued)

FOREIGN PATENT DOCUMENTS

EP  0661826 A2  7/1995

(Continued)

OTHER PUBLICATIONS

Sabine Kroner and Giovanni Ramponi, "Edge Preserving Noise Smoothing with an Optimized Cubic Filter," Univ. of Trieste, Italy, 4 pp.

(Continued)

*Primary Examiner*—Charles Kim

(57) ABSTRACT

In a specific embodiment of the present disclosure, a source image is smoothed to create a smoothed image, and an edge detector is used to create an edge layer. A blending controller is used to control a blending between the source image and the smoothed image. The blended destination image maintains detail while eliminating unwanted noise.

23 Claims, 8 Drawing Sheets

U.S. PATENT DOCUMENTS

| | | | | |
|---|---|---|---|---|
| 6,011,558 | A | * | 1/2000 | Hsieh et al. ............... 345/629 |
| 6,014,694 | A | | 1/2000 | Aharoni et al. |
| 6,040,863 | A | | 3/2000 | Kato |
| 6,081,295 | A | | 6/2000 | Adolph et al. |
| 6,141,693 | A | | 10/2000 | Perlman et al. |
| 6,144,402 | A | | 11/2000 | Norsworthy et al. |
| 6,160,913 | A | * | 12/2000 | Lee et al. ............... 382/176 |
| 6,167,084 | A | | 12/2000 | Wang et al. |
| 6,182,203 | B1 | | 1/2001 | Simar, Jr. et al. |
| 6,215,821 | B1 | | 4/2001 | Chen |
| 6,219,358 | B1 | | 4/2001 | Pinder et al. |
| 6,222,886 | B1 | | 4/2001 | Yogeshwar |
| 6,236,683 | B1 | | 5/2001 | Mougeat et al. |
| 6,259,741 | B1 | | 7/2001 | Chen et al. |
| 6,263,022 | B1 | | 7/2001 | Chen et al. |
| 6,300,973 | B1 | | 10/2001 | Feder et al. |
| 6,307,939 | B1 | | 10/2001 | Vigarie |
| 6,314,138 | B1 | | 11/2001 | Lemaguet |
| 6,323,904 | B1 | | 11/2001 | Knee |
| 6,366,614 | B1 | | 4/2002 | Pian et al. |
| 6,385,248 | B1 | | 5/2002 | Pearlstein et al. |
| 6,438,168 | B2 | | 8/2002 | Arye |
| 6,480,541 | B1 | | 11/2002 | Girod et al. |
| 6,526,099 | B1 | | 2/2003 | Christopoulos et al. |
| 6,549,561 | B2 | | 4/2003 | Crawford |
| 6,584,509 | B2 | | 6/2003 | Putzolu |
| 6,633,683 | B1 | | 10/2003 | Dinh et al. |
| 6,707,937 | B1 | * | 3/2004 | Sobel et al. ............... 382/162 |
| 6,714,202 | B2 | | 3/2004 | Dorrell |
| 6,724,726 | B1 | | 4/2004 | Coudreuse |
| 6,748,020 | B1 | | 6/2004 | Eifrig et al. |
| 2001/0026591 | A1 | | 10/2001 | Keren et al. |
| 2002/0106022 | A1 | | 8/2002 | Takahashi et al. |
| 2002/0110193 | A1 | | 8/2002 | Kim et al. |
| 2002/0114015 | A1 | * | 8/2002 | Fujii et al. ............... 358/302 |
| 2002/0138259 | A1 | | 9/2002 | Kawahara |
| 2002/0145931 | A1 | | 10/2002 | Pitts |
| 2002/0196851 | A1 | | 12/2002 | Lecoutre |
| 2003/0007099 | A1 | | 1/2003 | Zhang et al. |
| 2003/0093661 | A1 | | 5/2003 | Loh et al. |
| 2003/0152148 | A1 | | 8/2003 | Laksono |

FOREIGN PATENT DOCUMENTS

| | | |
|---|---|---|
| EP | 0698990 A1 | 2/1996 |
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| EP | 1087625 A2 | 3/2001 |
| JP | 07-210670 A | 8/1995 |
| WO | WO 01/95633 A2 | 12/2001 |
| WO | 02/01855 A2 | 1/2002 |
| WO | WO 02/080518 A2 | 10/2002 |

OTHER PUBLICATIONS

Jaemin Kim and John W. Woods, "Spatiotemporal Adaptive 3-D Kalman Filter for Video," 12 pp.

Julia J. Liu, "Applications of Wiener Filtering in Image and Video De-noising," ECE497KJ Course Project, 15 pp.

K. Jostschulte et al., "A Subband Based Spatio-Temporal Noise Reduction Technique for Interlaced Video Signals," 2 pp.

Pedro Assuncao and Mohammad Ghanbari, "Rate Reduction Techniques for MPEG-2 Video Bit Streams," SPIE vol. 2952, Apr. 1996, 10 pp.

Jae-Young Pyun, "QoS Provisioning for Video Streaming over IEEE 802.11 Wireless LAN," (abridged) IEEE Conference in Consumer Electronics, Jun. 16, 2003, 3 pp. [online] Retrieved from the Internet Jul. 8, 2003 at URL.

Krisda Lengwehasatit and Antonio Ortega, "Computationally Scalable Partial Distance Based Fast Search Motion Estimation," Univ. of Southern California, 4 pp., (date unknown).

Manoj Aggarwal and Ajai Narayan, "Efficient Huffman Decoding," 2000 IEEE, 0-7803-6297-7, pp. 936-939.

Peng Yin et al., "Video Transcoding by Reducing Spatial Resolution," Princeton University, Princeton, NJ, 4 pp., 2000.

Zhigang Fan and Ricardo de Queiroz, "Maximum Likelihood Estimation of JPEG Quantization Table in the Identification of Bitmap Compression History," Xerox Corporation, Webster, NY, 4 pp. (date unknown).

Luis Ducla Soares et al., "Influence of Encoder Parameters on the Decoded Video Quality for MPEG-4 Over W-CDMA Mobile Networks," NTT DoCoMo, Inc. technical paper, 4 pp. (date unknown).

Thomas Wiegand et al., "Long-Term Memory Motion-Compensated Prediction for Rubust Video Transmission," in Proc. ICIP2000, 4 pp.

P. Greg Sherwood et al., "Efficient Image and Channel Coding for Wireless Packet Networks," Univ. of CA, San Diego, CA, Dept. of ECE; 4 pp. (date unknown).

Donghoon Yu et al., "Fast Motion Estimation for Shape Coding in MPEG-4," 2003 IEEE Transactions on Circuits and Systems for Video Technology, vol. 13, No. 4, Apr. 2003, pp. 358-363.

Shine M. Thomas, Rahul Kumar & Vasudha Bhat, "An Efficient Implentation of MPEG-2 (BC1) Layer 1 & Layer 2 Stereo Encoder on Pentium-III Platform", Sasken Communication Technologies Limited, Banalore, India, pp. 1-10.

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al., "Video Transcoding For Multiple Clients," Proceedings of the SPIE, Bellingham, VA, vol. 4067, XP008012075, pp. 76-85, University of Washington, Sealttle, WA.

Lengwehasatit, Krisda et al., "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310. Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation. Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 02-05, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

OH, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014, Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000. pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatiotemporal Adaptive 3-D Kalman Filter for Video," pp. 1-12, Samsung Semiconductor, Inc. San Jose, Califiornia.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dorimund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encoder and Decorder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., " Unified Headend Technical Management of Digital Services," BigBend Networks, Inc.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"Conexant Products & Tech Info: Product Briefs: CX24108," 2000-2002 Conexant Systems, Inc. access on Apr. 20, 2001.

"Conexant Products & Tech Info: Product Briefs: CX22702," 2000-2002 Conexant Systems Inc. access on Apr. 20, 2001.

"TDC: Components for Modems & Digital Infotainment: Direct Broadcast Satellite Chipset," 2001 Telecom Design Communications Ltd., U.K., <<http://www.idc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"Ice Fyre Semiconductor: IceFyre 5-GHz OFDM Modem Solution," Sep. 2001, pp. 1-6, Icefyre: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specification: High-Speed Physical Layer in the 5 GHz Band," 1999 IEEE, pp. 1-83. Supplement to IEEE Standard fo rInformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

\* cited by examiner

211

|    | 1 | 2 | 3 | 4 | 5 | 6 | 7 | 8 | 9 | 10 |
|----|---|---|---|---|---|---|---|---|---|----|
| 1  | 0 | 0 | 1 | 0 | 0 | 0 | 0 | 0 | 0 | 0  |
| 2  | 0 | 0 | 1 | 0 | 0 | 1 | 0 | 0 | 1 | 0  |
| 3  | 1 | 1 | 1 | 0 | 0 | 1 | 1 | 0 | 0 | 1  |
| 4  | 0 | 0 | 1 | 0 | 1 | 1 | 0 | 0 | 1 | 1  |
| 5  | 0 | 0 | 1 | 0 | 1 | 1 | 1 | 1 | 1 | 0  |
| 6  | 0 | 0 | 1 | 0 | 0 | 0 | 1 | 0 | 1 | 0  |
| 7  | 0 | 0 | 0 | 1 | 0 | 0 | 0 | 0 | 1 | 0  |
| 8  | 0 | 1 | 0 | 0 | 1 | 0 | 0 | 0 | 0 | 0  |
| 9  | 0 | 0 | 0 | 0 | 0 | 1 | 0 | 0 | 0 | 0  |
| 10 | 0 | 0 | 0 | 0 | 0 | 1 | 0 | 0 | 0 | 0  |

*FIG. 3*

|    | 1  | 2  | 3  | 4  | 5  | 6  | 7  | 8  | 9  | 10 |
|----|----|----|----|----|----|----|----|----|----|----|
| 1  | 10 | 01 | 01 | 01 | 10 | 01 | 01 | 01 | 01 | 01 |
| 2  | 10 | 01 | 01 | 11 | 11 | 01 | 11 | 11 | 01 | 01 |
| 3  | 12 | 03 | 12 | 21 | 21 | 02 | 02 | 21 | 11 | 01 |
| 4  | 10 | 01 | 11 | 12 | 12 | 02 | 21 | 21 | 02 | 02 |
| 5  | 10 | 01 | 11 | 12 | 22 | 13 | 23 | 13 | 12 | 11 |
| 6  | 10 | 01 | 01 | 01 | 20 | 01 | 11 | 02 | 11 | 01 |
| 7  | 00 | 10 | 01 | 01 | 01 | 10 | 10 | 01 | 01 | 01 |
| 8  | 01 | 01 | 11 | 11 | 01 | 01 | 10 | 00 | 00 | 00 |
| 9  | 00 | 00 | 00 | 10 | 01 | 01 | 01 | 10 | 00 | 00 |
| 10 | 00 | 00 | 00 | 10 | 01 | 01 | 01 | 10 | 00 | 00 |

|   | 1 | 2 | 3 | 4 | 5 | 6 | 7 | 8 | 9 | 10 |
|---|---|---|---|---|---|---|---|---|---|----|
| 1 | 0 | 0 | 1 | 0 | 0 | 0 | 0 | 0 | 0 | 0 |
| 2 | 0 | 0 | 1 | 0 | 0 | 1 | 0 | 0 | 1 | 0 |
| 3 | 1 | 1 | 1 | 0 | 0 | 1 | 1 | 0 | 0 | 1 |
| 4 | 0 | 0 | 1 | 0 | 1 | 1 | 0 | 0 | 1 | 1 |
| 5 | 0 | 0 | 1 | 0 | 1 | 1 | 1 | 1 | 1 | 0 |
| 6 | 0 | 0 | 1 | 0 | 0 | 0 | 1 | 0 | 1 | 0 |
| 7 | 0 | 0 | 0 | 1 | 0 | 0 | 0 | 0 | 1 | 0 |
| 8 | 0 | 1 | 0 | 0 | 1 | 0 | 0 | 0 | 0 | 0 |
| 9 | 0 | 0 | 0 | 0 | 0 | 1 | 0 | 0 | 0 | 0 |
| 10| 0 | 0 | 0 | 0 | 0 | 1 | 0 | 0 | 0 | 0 |

201
203

214

|   | 1 | 2 | 3 | 4 | 5 | 6 | 7 | 8 | 9 | 10 |
|---|---|---|---|---|---|---|---|---|---|----|
| 1 | 50 | 32 | 32 | 42 | 51 | 21 | 31 | 41 | 21 | 11 |
| 2 | 42 | 15 | 34 | 63 | 72 | 23 | 43 | 62 | 32 | 22 |
| 3 | 52 | 25 | 54 | 84 | 94 | 45 | 84 | 93 | 44 | 24 |
| 4 | 52 | 25 | 54 | 75 | 95 | 37 | 86 | 95 | 55 | 34 |
| 5 | 60 | 43 | 63 | 65 | 94 | 46 | 85 | 76 | 55 | 34 |
| 6 | 40 | 32 | 53 | 64 | 83 | 54 | 84 | 46 | 44 | 33 |
| 7 | 21 | 22 | 33 | 53 | 72 | 62 | 91 | 53 | 42 | 22 |
| 8 | 11 | 21 | 22 | 42 | 33 | 32 | 51 | 41 | 21 | 11 |
| 9 | 01 | 11 | 21 | 41 | 13 | 13 | 22 | 30 | 10 | 10 |
| 10| 10 | 10 | 20 | 40 | 12 | 12 | 12 | 20 | 00 | 00 |

*FIG. 4*

METHOD AND SYSTEM FOR NOISE REDUCTION IN AN IMAGE

BACKGROUND

Video images, and especially analog video signals can be corrupted by varied types of temporal and spatial noise during acquisition, transmission, and recording of the image. Typical types of noise include thermal noise, single frequency modulation distortion noise, and impulse noise. Noise reduction techniques that apply linear or non-linear filters on video signals can reduce the amount of noise. One such technique is to apply a low-pass filter on the video signal. However, simple low-pass filtering tends to produce over-smoothed video that appears blurry. Other filters such as Wiener filters, Kalman filters are better at removing one or more of spatial noise or temporal noise but can be expensive in terms of implementation and device costs.

Therefore, a method of noise reduction that overcomes these problems would be useful.

FIELD OF THE DISCLOSURE

The present disclosure relates to data processing, and more specifically to image and video processing.

BRIEF DESCRIPTION OF THE DRAWINGS

The present disclosure may be better understood, and its features and advantages made apparent to those skilled in the art by referencing the accompanying drawings.

FIG. 3 represents Boolean edge data in accordance with a specific embodiment of the present disclosure;

FIG. 4 represents weighted edge data in accordance with a specific embodiment of the present disclosure;

FIG. 9 represents an intermediate data in accordance with a specific embodiment of the present disclosure.

The use of the same reference symbols in different drawings indicates similar or identical items.

DESCRIPTION OF THE PREFERRED EMBODIMENT(S)

In a specific embodiment of the present disclosure, a source image is smoothed to create a smoothed image, and an edge detector is used to create an edge layer. A blending controller is used to control a blending between the source image and the smoothed image. The blended destination image maintains detail while eliminating unwanted noise. Specific implementations of the present disclosure are better understood with reference to FIGS. 1-8.

Figure 1:
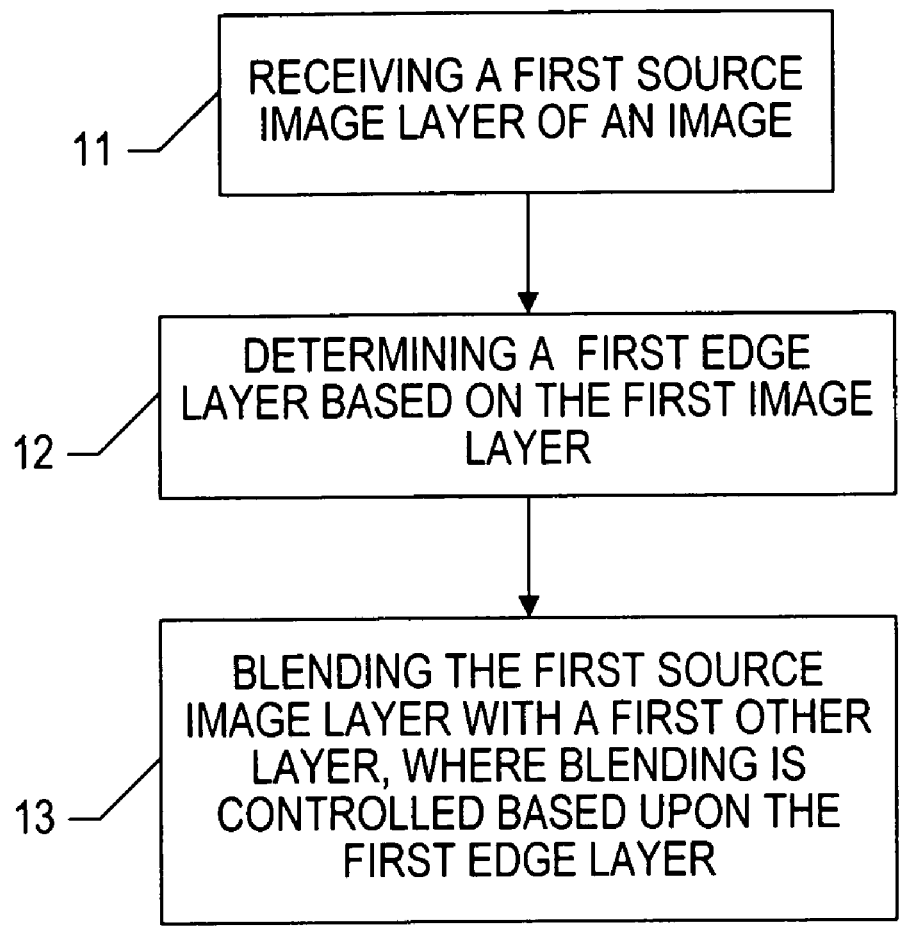
FIG. 1 represents, in flow diagram form, a method in accordance with the present disclosure.

FIG. 1 illustrates in flow diagram form a method in accordance with the present disclosure. The method of FIG. 1 is discussed with reference to the system of FIG. 2, which illustrates in block diagram form data flow through a system 100 in accordance with the present disclosure.

System 100 comprises noise filter 140, edge detector 150 and blending controller 160. In addition, system 100 includes memory (not specifically shown) for storing image information including source image 112, smoothed layer 120, edge layer 130, and destination layer 135. The layers are accessible by the noise filter 140, edge detector 150 and blending controller 160.

Figure 2:
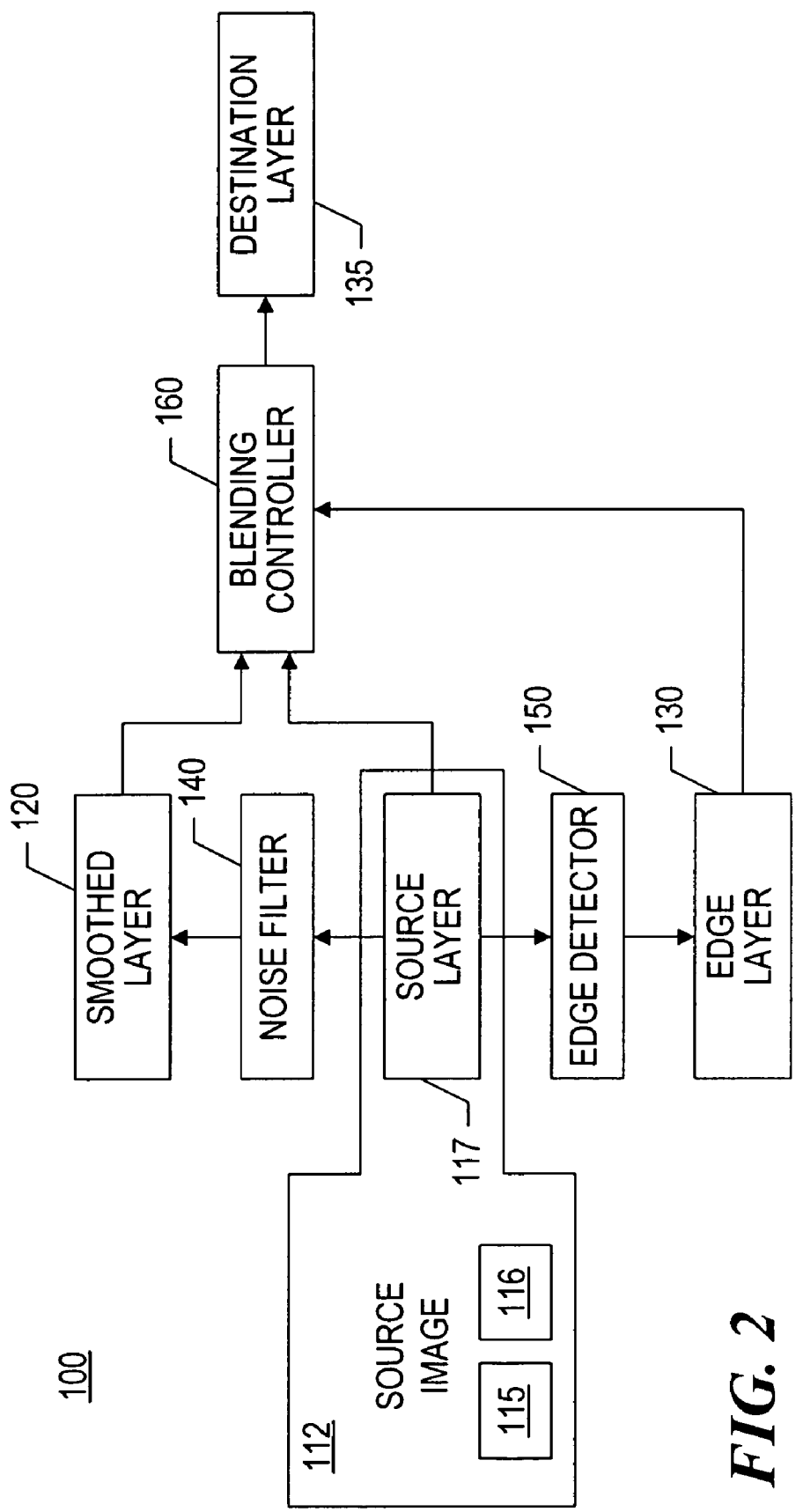
FIG. 2 represents, in block diagram form, a system in accordance with a specific embodiment of the present disclosure.

A first image layer is received at step 11. Referring to FIG. 2, source layer 117 is an example of such a first image layer. The source layer 117 is one of three component layers, along with layers 115 and 116, which make up the source image 112. Examples of types of component layers 115-117 include RGB component layers, YUV component layers, and component layers of any other color spaces. The system 100 receives source image 112 by receipt of a video stream or by accessing a memory location.

The source providing the source image can be a head end device, a TV receiver, a Video Cassette Recorder, a DVD (Digital Versatile Disk) player, or other video sources.

Upon receipt of the source image 112, each image layer 115-117 is processed independently. For purposes of discussion, data flow with respect to FIGS. 1 and 2 will be discussed with respect to one of the source layers, source layer 117. In addition, it will be appreciated that the layer information may be stored and processed as frames or partial frames, such as line buffers depending upon a systems specific implementation. For ease of discussion, it will be assumed the image information is stored as entire frames.

At step 12, a first edge layer is determined based on the first image layer. With reference to FIG. 2, source layer 117 is processed by the edge detector 150 to determine the edge layer 130.

The edge layer 130 comprises a plurality of memory locations corresponding to the plurality of pixels of an image. The edge layer 130 contains a pixel edge indicator for each pixel that indicates whether a pixel is associated with an edge of an image. In one embodiment, a pixel edge indicator is a Boolean representation indicating the presence or absence of an edge. For example, a positive Boolean pixel edge indicator would indicate that a specific pixel is part of an image edge.

The edge detector 150 can detect edges by determining a gradient for each pixel location. For example, the horizontal and vertical gradient of a pixel can be calculated using the equations $Grad\_x = p(i+1,j) - p(i-1,j);$ and $Grad\_y = p(i,j+1) - p(i,j-1).$ A rectangular-to-polar conversion, such as $M(i,j) = SQRT(Grad\_x^2 + grad\_y^2)$, can then be performed to get a magnitude of the edge. Alternatively, the square root operation can be removed and the magnitude compared to a predefined edge-level that controls what is considered an edge, and ultimately controls how many details will be preserved in a final destination layer. For example, if the magnitude is larger than the predefined value of the edge-level, then the corresponding pixel is said to be an edge pixel. In other embodiments, the edge detector 150 can determine the presence of an edge solely based on a pixel's horizontal or vertical edge component.

FIG. 3 represents a portion 212 of a Boolean edge layer that contains Boolean pixel edge indicators. The 10 by 10 matrix of FIG. 3 represents the top left-most pixels of an image layer. For purposes of illustration, a "1" value indicates that the pixel at that location has been identified as an edge pixel, while a "0" value indicates that the pixel at that location has been identified as not being an edge pixel. In an alternate embodiment, the edge layer 130 can contain weighted edge indicators, as illustrated in FIG. 4.

FIG. 4 illustrates a portion of a weighted edge layer 214 that contains weighted edge indicators. The specific implementation of FIG. 4 assigns a weighted value to a pixel by determining a number of Boolean pixel edge indicators within +/−1 pixels of the pixel and storing this value in the lower four-bits of a data byte, and storing in the upper four-bits of the data byte the number of Boolean pixel edge indicators that are at +/− two pixels from the pixel. The number of Boolean pixel edge indicators in layer 212 that are at +/− two pixels from the pixel can be calculated by determining the number Boolean pixel edge indicators that are within +/− two pixels from the pixel and subtracting the number of Boolean pixels edge indicators that are +/−1 pixel from the pixel.

For example, the number of Boolean edge pixels in layer 212 within +/− pixels of pixel P94,4) is indicated by the value 5 in layer 114. This value is stored in the lower 4-bits of the pixel P(4,4) in the weighted edge layer 214. The number of edge pixels within the box 203 of Boolean edge layer 212 is 12. The number of these pixels that are two pixels away from the pixel location P(4,4) is determined by subtracting the number of edge pixels within the box 201 from the edge pixels within the box 212, which results in a value of 7. This value is stored in the upper 4-bits of pixel P(4,4) in layer 211. Therefore the weighted pixel value of pixel P(4,4) is "75". It will be appreciated that many other schemes for determining and/or storing weighted edge values are possible.

Returning to FIG. 1, at step 13 the first image layer is blended with a first other layer based upon the first edge layer. In one embodiment, the first other layer is the source layer 117.

The blending controller 160 of FIG. 2 is used to implement the blending, and uses information of edge layer 130 to blend the source layer 117 with the smoothed layer 120 to preserve edges and fine structures in the source image layer 117. When the edge layer contains only Boolean edge information one of two blending ratios can be implemented by the blending controller 160 at each pixel location. However, typically, the ability to blend a pixel based on one of only two blending ratios will not provide enough blending options to provide a destination image with an enhanced image.

Figure 5:
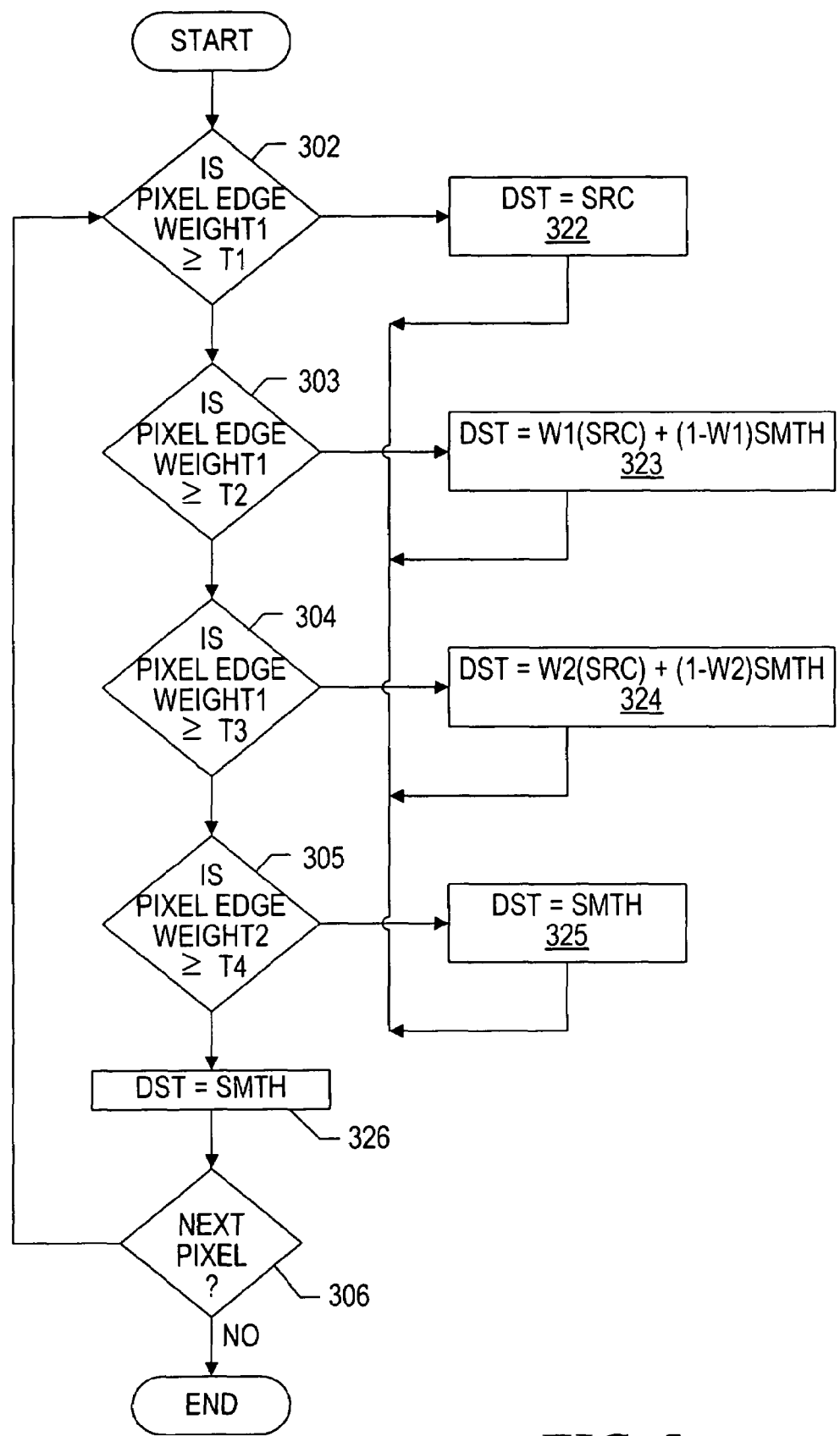
FIG. 5 represents, in flow diagram form, a method of blending accordance with a specific embodiment of the present disclosure.

To provide additional levels of blending, a weighted edge layer, such as is illustrated in FIG. 4 can be used by the blending controller 160 to select one of more than two blending ratios with respect to the blending of a specific pixel. FIG. 5 discloses a specific blending method for use with weighted edge values.

At step 302, a determination is made whether the pixel edge value labeled WEIGHT1 is greater than a variable T1. WEIGHT1 represent the number of edge pixels within +/−1 pixel of the pixel being scaled. With respect to FIG. 4, this would be the value stored at the lower 4 bits of a pixel location. If WEIGHT1 is greater than threshold T1, flow proceeds to step 322, where the source image pixel is copied directly to the destination layer, such as destination layer 135. Otherwise, flow proceeds to step 303.

At step 303, a determination is made whether the pixel edge value WEIGHT1 is greater than T2. If so, flow proceeds to step 323, where the source image pixel is blended with the smoothed image at a ratio of 3:1. Otherwise, flow proceeds to step 304.

At step 304, a determination is made whether the pixel edge value WEIGHT1 is greater than T3. If so, flow proceeds to step 3:1, where the source image pixel is blended with the smoothed image at a ratio of 1:1. Otherwise, flow proceeds to step 305.

At step 305, a determination is made whether the pixel edge value labeled WEIGHT2 is greater than a variable T4. WEIGHT2 represent the number of edge pixels at +/−2 pixels of the pixel being scaled. With respect to FIG. 4, this would be the value stored at the upper 4 bits of a pixel location. If WEIGHT2 is greater than the value of X4 flow proceeds to step 325, where the source image pixel is blended with the smoothed image at a ratio of 1:3. Otherwise, flow proceeds to step 326.

At step 326, the destination pixel is set equal to the smoothed pixel.

At step 306, a determination is made whether there is another pixel. If so, flow proceeds to step 302 to process the next pixel, otherwise the flow ends.

The variables T1, T2, T3, and T4 are predetermined, and as such can be preset or user defined variables. In another embodiment, the variables T1 through T4 can be statistically determined based upon the source image. In a specific embodiment, the variables T1 to T4 are set to 7, 3, 1, and 3 respectively.

Figure 6:
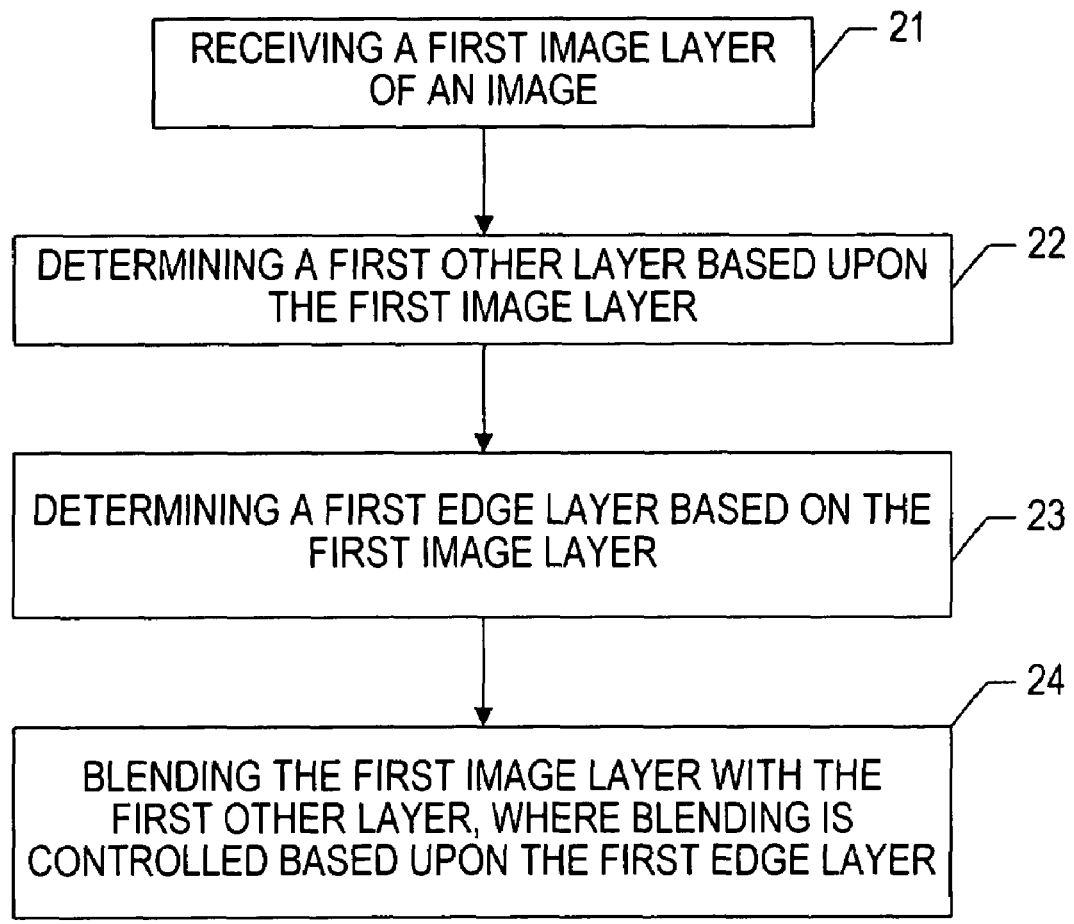
FIGS. 6 and 7 represent, in flow diagram form, methods in accordance with specific embodiments of the present disclosure.

FIG. 6 illustrates another method in accordance with an embodiment of the present disclosure.

At step 21, a first image layer of an image is received. In a manner similar to step 11 of FIG. 1.

At step 22, the first other layer is determined. Typically, the first other layer is determined by noise filter 140, which filters the source layer to provide a smoothed image. Noise filter 140 can be any type of noise filter, but will typically be either a low-pass filter or median filter depending upon the cost-performance ratio considerations of system 100. In one embodiment, a low-pass filter consisting of a five-tap horizontal filter and a five-tap vertical filter is used. Different coefficients can be used depending upon a desired noise level. In one embodiment, three noise levels implemented by the noise filters have cut-off frequencies of 0.7 fs, 0.5 fs, and 0.3 fs. An intermediate smoothing layer can be formed by applying the low-pass filter on the horizontal direction and storing the results in memory, with a final smoothed layer including filtering in the vertical direction being formed prior to blending. A 2-dimensional median filter can be used supporting three sizes: 1×1, 3×3, and 5×5.

At step 23, a first edge layer is determined in a manner similar to that discussed with respect to step 12 of FIG. 1.

At step 24, the first image and the first other layer are blended in a manner similar to that discussed with respect to step 13 of FIG. 1.

Figure 7:
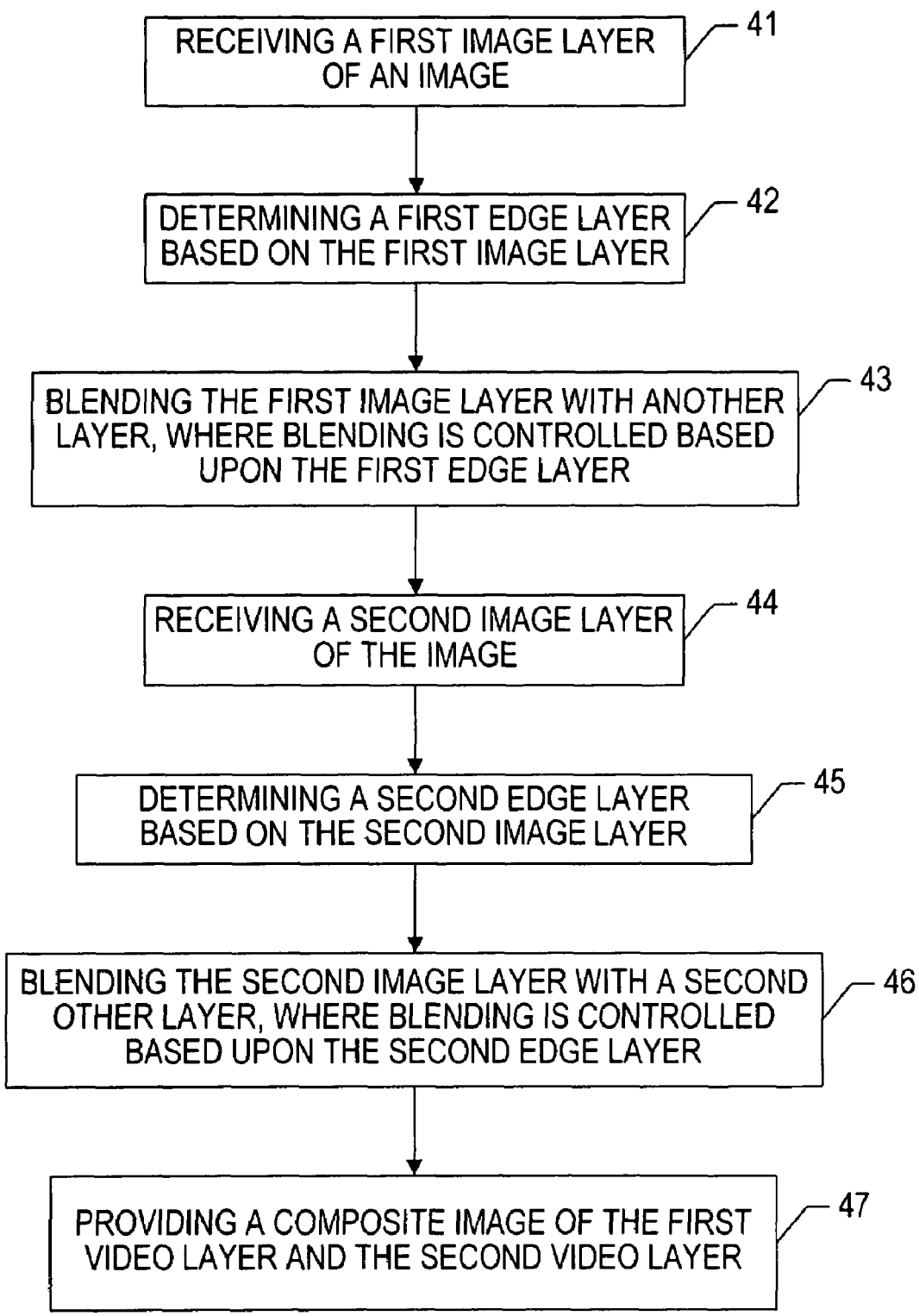

FIG. 7 illustrates another method in accordance with an embodiment of the present disclosure. Steps 41, 42, and 43 are similar in function to steps 21, 22, and 23 previously discussed.

Step 44 is similar to step 41 but receives a second source image layer instead of the first source image layer.

Step 45 is similar to step 42, but a second edge layer based on the second source image layer is determined.

Step 46 is similar to step 43, but the second source image layer is blended with the second other layer instead of the first source image layer being blended with the first layer. The result of step 46 is a second blended video layer.

At step 47, a composite image combining the first and second blended video layers is provided. It will be appreciated that typically, additional steps, analogous to steps 41-43 will be performed to generate a third blending layer from which a composite image is formed.

Figure 8:
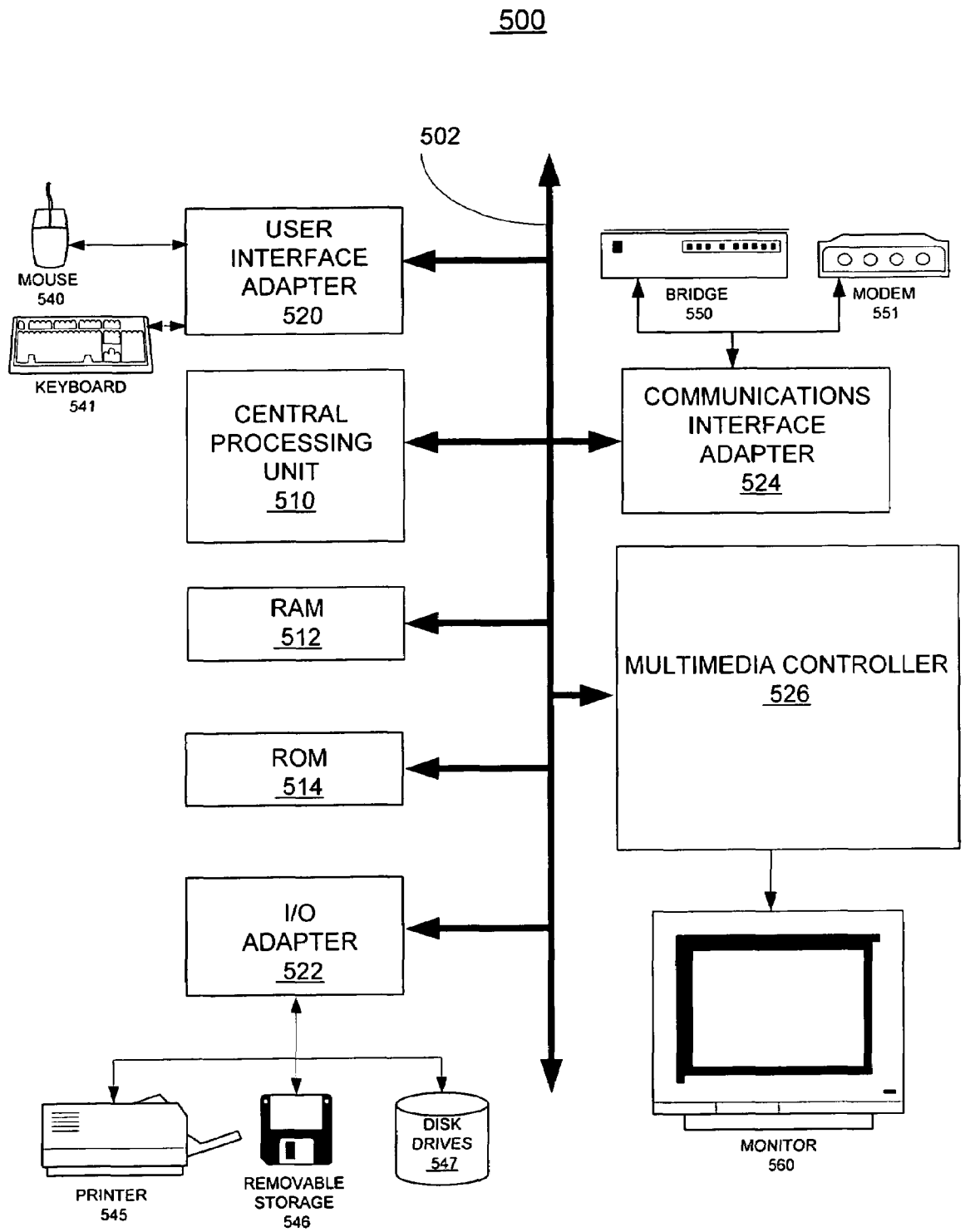
FIG. 8 represents, in block diagram form, a system in accordance with the present disclosure.

FIG. 8 illustrates, in block diagram form, a data processing system that may represent a general purpose processing system, such as a personal computer or a personal digital assistant, or an application specific system such as a media server, internet appliance, home networking hubs, and the like. The system 500 is illustrated to include a central processing unit 510, which may be a conventional or proprietary data processor, memory including random access memory 512, read only memory 514, input output adapter 522, a user interface adapter 520, a communications interface adapter 524, and a multimedia controller 526.

The input output (I/O) adapter 526 can be further connected to various peripherals such as disk drives 547, printer 545, removable storage devices 546, as well as other standard and proprietary I/O devices.

The user interface adapter 520 can be considered to be a specialized I/O adapter. The adapter 520 is illustrated to be connected to a mouse 540, and a keyboard 541. In addition, the user interface adapter 520 may be connected to other devices capable of providing various types of user control, such as touch screen devices.

The communications interface adapter 524 is connected to a bridge 550 such as is associated with a local or a wide area network, and a modem 551. By connecting the system bus 502 to various communication devices, external access to information can be obtained.

The multimedia controller 526 will generally include a video graphics controller capable of generating smoothed images in the manner discussed herein that can be displayed, saved, or transmitted. In a specific embodiment illustrated the multimedia controller 526 can include a system of FIG. 2, which can be implemented in hardware or software. Software implementations can be stored in any on of various memory locations, including RAM 512 and ROM 514, in addition software implementation software can be stored in the multimedia controller 526. When implemented in software, the system of FIG. 2 may be a data processor within the controller 526 for executing instruction, or it maybe a shared processor, such as CPU 510.

The preceding detailed description of the figures, reference has been made to the accompanying drawings which form a part thereof, and to which show by way of illustration specific embodiments in which the invention may be practiced. It will be appreciated that many other varied embodiments that incorporate the teachings herein may be easily constructed by those skilled in the art. For example, intermediate edge layers can be used to derive the final edge layer used by the blending controller 160. Once such intermediate layer would contain pixel information that indicates horizontally adjacent pixel information. For example, FIG. 9 illustrates an intermediate table, where each pixel stores the number of edge pixels within +/−1 horizontal pixel in the lower four-bits of the byte, and the number of edge pixels at +/−2 horizontal pixels in the upper four-bits of the byte. Such an intermediate layer allows for efficient calculation of the final edge layer. For example, the number of edge pixels within +/− pixels for a pixel P(x, y) can be determined by adding the lower four bits of pixels P(x, y−1), P(x,y), and P(x, y+1). In a similar manner, the number of edge pixels at +/−2 pixels for a pixel P(x, y) is determined by adding the upper four bits of P(x, y−2), P(x, y−1), P(x,y), P(x, y+1), and P(x, y+2) to the lower four bits of P(x, y−2) and P(x, y+2). Utilizing an intermediate layer in this fashion reduces the computations needed to calculate the weighted edge values by reusing the horizontal edge data. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. A method comprising:
using a processor to perform steps comprising:
receiving a first video layer of a video image;
determining a first edge layer based on the first video layer, wherein the first edge layer includes an edge indicator at a pixel when a gradient at the pixel is greater than a predetermined value;
determining a first weighted edge layer comprising a weighted value for each pixel of the first edge layer, each weighted value comprising:
a first set of bits representative of a number of Boolean pixel edge indicators within one pixel of the corresponding pixel of the first edge layer; and
a second set of bits representative of a number of Boolean pixel edge indicators within two pixels of the corresponding pixel of the first edge layer; and
blending the first video layer with a first other layer based upon only one of a vertical edge component or a horizontal edge component of the first edge layer and based upon the weighted values of the first weighted edge layer, the first other layer comprising a smoothed representation of the first video layer.

2. The method of claim 1, farther comprising:
receiving a second video layer of the video image;
determining a second edge layer based on the second video layer;
determining a second weighted edge layer comprising a weighted value for each pixel of the second edge layer, each weighted value comprising:
a third set of bits representative of a number of Boolean pixel edge indicators within one pixel of the corresponding pixel of the second edge layer; and
a fourth set of bits representative of a number of Boolean pixel edge indicators within two pixels of the corresponding pixel of the second edge layer; and
blending the second video layer with a second other layer, wherein the blending is controlled by the second edge layer and the second weighted edge layer.

3. The method of claim 2, further comprising:
providing a composite of the first video layer and the second video layer for display on a display device.

4. The method of claim 1, wherein the first video layer is one of an R, G, and B layer.

5. The method of claim 1, wherein the first video layer is one of a Y, U, and V layer.

6. The method of claim 1, wherein blending is based upon the horizontal edge component independent of the vertical edge component.

7. The method of claim 6, wherein the gradient at the pixel is a horizontal gradient at the pixel.

8. The method of claim 1, wherein blending is based upon the vertical edge component independent of the horizontal edge component.

9. The method of claim 8, wherein the gradient at the pixel is a vertical gradient at the pixel.

10. The method of claim 1, wherein the predefined value is user definable.

11. The method of claim 1, wherein the weighted value comprises an eight-bit byte, the first set of bits comprises the lower four bits of the byte, and the second set of bits comprises the upper four bits of the byte.

12. A method comprising:
using a processor to perform steps comprising:
determining an edge layer based upon an image layer of a video image, wherein the edge layer includes an edge indicator at a pixel when a gradient at the pixel is greater than a predetermined value;
determining a filtered layer based upon the image layer;
determining a weighted edge layer comprising a weighted value for each pixel of the edge layer, each weighted value comprising:
   a first set of bits representative of a number of Boolean pixel edge indicators within one pixel of the corresponding pixel of the edge layer; and
   a second set of bits representative of a number of Boolean pixel edge indicators within two pixels of the corresponding pixel of the edge layer; and
determining a blending ratio for each pixel of a blended image layer based upon the weighted edge layer, wherein the blending ratio is to control blending the image layer and the filtered layer to form the blended image layer, and the blending ratio is based on only one of a vertical edge component or a horizontal edge component of the edge layer.

13. The method of claim 12, wherein the filtered layer represents a smoothed video image.

14. The method of claim 12, wherein the blending ratio is based on the vertical edge component independent of the horizontal edge component.

15. The method of claim 14, wherein the gradient at the pixel is a vertical gradient at the pixel.

16. The method of claim 12, wherein the blending ratio is based on the horizontal edge component independent of the vertical edge component.

17. The method of claim 16, wherein the gradient at the pixel is a horizontal gradient at the pixel.

18. The method of claim 12, wherein the predetermined value is user definable.

19. The method of claim 12, wherein the weighted value comprises an eight-bit byte, the first set of bits comprises the lower four bits of the byte, and the second set of bits comprises the upper four bits of the byte.

20. A system comprising:
a noise filter coupled to receive a source video image and to provide a smoothed video image;
an edge detector coupled to receive the source video image and to provide an edge layer and a weighted edge layer comprising a weighted value for each pixel of the edge layer, each weighted value comprising:
   a first set of bits representative of a number of Boolean pixel edge indicators within one pixel of the corresponding pixel of the edge layer; and
   a second set of bits representative of a number of Boolean pixel edge indicators within two pixels of the corresponding pixel of the edge layer; and
a blending controller coupled to receive the smoothed video image, the weighted edge layer, and the edge layer and to provide a destination layer of a video image based upon the smoothed video image, the weighted edge layer, and only one of a vertical edge component or a horizontal edge component of the edge layer.

21. The system of claim 20, wherein the blending controller is to provide the destination layer of the video image based on the vertical edge component independent of the horizontal edge component.

22. The system of claim 20, wherein the blending controller is to provide the destination layer of the video image based on the horizontal edge component independent of the vertical edge component.

23. The system of claim 20, wherein the weighted value comprises an eight-bit byte, the first set of bits comprises the lower four bits of the byte, and the second set of bits comprises the upper four bits of the byte.

* * * * *